United States Patent Office 3,411,941
Patented Nov. 19, 1968

3,411,941
PROCESS FOR COATING A METALLIC ARTICLE WITH THERMALLY REFLOWABLE CELLULOSE ACETATE BUTYRATE/MELAMINE-FORMALDE-HYDE RESIN/ALKYD OR ACRYLIC RESIN COATING COMPOSITIONS
Jack W. Lowe, Jr., and James D. Crowley, Kingsport, Tenn., assignors to Eastman Kodak Company, Rochester, N.Y., a corporation of New Jersey
No Drawing. Filed Mar. 1, 1965, Ser. No. 436,363
19 Claims. (Cl. 117—64)

ABSTRACT OF THE DISCLOSURE

Method of coating metallic articles with a thermally reflowable thermosetting coating composition, comprising the steps of first applying to the metallic article a solvated coating composition comprising cellulose acetate butyrate, melamine-formaldehyde resin, and either an alkyd resin or an acrylic resin; drying the coated article at temperatures ranging from about 120° F. to about 225° F.; sanding the surface of the dried coating composition; and then consecutively thermally reflowing and thermosetting the coating composition at temperatures ranging from about 250° F. to about 450° F. The method finds utility in the application of paints to automobiles.

This invention relates to thermosetting coating compositions and more particularly to thermosetting coating compositions having thermal reflow properties.

In the automotive industry, there are presently two types of top coats used as exterior finishes—lacquers and enamels. The lacquers are usually thermoplastic, a typical lacquer being composed of an acrylic resin, cellulose ester, and appropriate plasticizers. More specifically, a typical lacquer might be composed of methyl methacrylate resin, cellulose acetate butyrate, and appropriate plasticizers.

On the other hand, automotive-type enamels are thermosetting in nature and are formulated by combining either alkyd or acrylic resins with melamine-formaldehyde resins. In this instance, the acrylic resins are different from the ones used in thermoplastic resins in that they have been modified with various pendant groups such as hydroxyls, carboxyls, or amides so as to have areas of reactivity, thereby enabling them to cross-link with the melamine-formaldehyde resins. The alkyd resins possess reactivity either from unsaturation or the presence of certain pendant groups, the most common one being the hydroxyl group. Although converting resins other than melamine-formaldehydes will effectively cross-link with alkyds and thermosetting acrylic resins, it is recognized in the trade that the melamine-formaldehyde resins provide the best known exterior durability.

Other differences between lacquers and enamels are shown by the finishing and repairing techniques. The latest technique in finishing an automobile with a lacquer is known as the thermal-reflow process or bake-sand-bake. In this procedure, the primed car is top coated with the thermoplastic lacquer, after which it is force dried at a low bake temperature to promote the release of volatile solvents. Then, any rough spots, sagging, or other imperfections in the coating are eliminated by a wet sanding operation. The car is then baked at a higher temperature, during which time the lacquer becomes fluid and reflows, allowing all of the sand marks to melt in. Upon emerging from the oven, the finished automobile has a very high degree of gloss and no further sanding, buffing, or polishing is required.

In addition to obtaining a mirror finish appearance without buffing or polishing, another major advantage of the thermal reflow process is observed when spot repairing the car finish. Even after the final bake, an average of three to four spot repairs must be made on the automobile finish. Many of these spots that have to be repaired result by accidental maring of the finish during the installation of trim, windows, and other accessories. A spot repair can be made quite easily on the lacquer-finished car since the finish is thermoplastic in nature. The area to be repaired is sanded to a feathered-out edge and a coat of lacquer sprayed over the area to be repaired, followed by solvent polishing with a very slow evaporating solvent such as ethylene glycol monoethyl ether acetate. By spraying the repaired area immediately surrounding it with such a solvent, the repaired spot is melted in with the rest of the top coat. After a spot repair is made, the car is passed through a low-bake oven to promote the release of the solvents.

However, the finishing techniques with an enamel are quite different. The primed auto body is top coated with the enamel composition after which it is flash dried and baked in an oven. During this time, the finish becomes cross-linked and is cured as evidenced by its insolubility in acetone. This curing process gives the enamel finish a textured or orange-peel appearance rather than a smooth, mirror-image finish. It is not possible to eliminate the orange-peel appearance of an enamel, and the best one can do it minimize it as much as possible. Thus, in effect, the showroom appearance of a thermoplastic lacquer finished automobile is quite superior to the enamel finished car.

Furthermore, the present enamel finishes cannot be subjected to a bake-sand-bake operation since they will not dry adequately at a low-bake temperature so that sanding can be performed. Prior to conversion, enamels do no form a film but remain tacky until they are chemically cross-linked at elevated temperatures. Because of this slow drying, the enamel has less resistance to dirt pick-up than the lacquer.

Another serious drawback to finishing cars with enamel-type coatings is encountered in spot repairing. When a repair is made, the adhesion of the repair coat to the already cured enamel is unusually poor. Therefore, if the area to be repaired is very large, one must resort to sanding the entire panel, whether it be the complete door, fender, or hood, to obtain adequate adhesion of the repair coat to the cured enamel.

In view of these disadvantages, the users of enamel finishes feel it would be quite desirous to have a thermosetting-type finish with thermal reflow properties. Further, they would like such a finish to dry like a lacquer but yet, once cross-linked, be inert to standard enamel solvents such as aromatic hydrocarbons and alcohols.

One object of our invention is to provide a thermosetting coating composition having thermal reflow properties. Another object of our invention is to provide a thermosetting coating composition having improved innercoat adhesion when spot repairs are made. A further object of our invention is to provide a thermosetting coating composition which will cure to a mirror-smooth finish. Still another object of our invention is to provide a thermosetting coating composition which, after cross-linking, is inert to standard enamel solvents. Other objects of our invention will appear herein.

We have discovered that these and other objects are accomplished by incorporating enough of a particular type of cellulose acetate butyrate into conventional thermosetting enamel coating compositions. The first thing accomplished by using the particular cellulose acetate butyrate in these systems is to cause them to dry like a lacquer. After air drying and a low bake, the modified enamels can be wet sanded in order to remove the orange-peel texture of the coating along with other imperfections such as rough spots, running, and sagging. The coated panels may then be baked at a higher temperature, during which time the finish will thermally reflow and the sand marks will melt in, followed immediately by a cross-linking process between the melamine-formaldehyde resin and either the acrylic or alkyd resin. Upon leaving the oven, the autmobile finished with the modified enamel of our invention has a very high degree of gloss and no further sanding, buffing, or polishing is required.

In summary, the particular cellulose acetate butyrate used herein gives enamel coating compositions several advantages over the conventional enamel coating compositions. It gives them the drying properties of a lacquer by forming a film after evaporation of the solvents, thereby enabling a wet sanding operation to be performed. The dirt pickup of the modified finishes is reduced due to the ability of the system to dry in a relatively short time at room temperature. After wet sanding, the cellulose acetate butyrate, being thermoplastic in nature, aids in the reflow process, thereby causing the sand marks to fuse together before cross-linking occurs. The cellulose acetate butyrate appears in no way to cross-link and remains completely thermoplastic.

The fact that the cellulose acetate butyrate does not cross-link in this system allows for superior inner coat adhesion between a repair coat and the cured topcoat. This results from the solvent system of the repair coat softening the cellulose acetate butyrate in the cured coat to a slight degree. However, it should be noted that once the modified enamel system has been cured at the high-bake temperature, it cannot be resanded and reflowed.

Another advantage of using the modified compositions involves floating and flooding of pigments. Pigments of coating compositions presently in use may have a tendency to float to the surface and/or flood a certain area of the topcoat. Such occurrences leave the finished product with less than a highly desirable coating. Incorporation of the particular cellulose acetate butyrate mentioned above will eliminate the problem of floating and flooding of pigments contained in the coating systems now in use.

A cellulose acetate butyrate with the following specifications must be employed in the coating system to obtain the above-described results:

|  | Maximum | Minimum |
| --- | --- | --- |
| Butyryl content | 56 | 45 |
| Acetyl content | 5 | 0 |
| Hydroxyl content | 5 | 0.05 |
| Intrinsic viscosity | 1.0 | 0.2 |

There are several practical reasons for keeping the cellulose acetate butyrate composition within the specified ranges. The chances of finding compatability with melamine-formaldehyde and thermosetting acrylic resins are greatly decreased as the butyryl content is decreased and as the acetyl content is increased from the specified limits. If the intrinsic viscosity falls below the minimum value, the polymer does not have enough dimensional stability to be useful in this type of system. On the other hand, if the intrinsic viscosity is in excess of the maximum value, the viscosity of the resulting composition is quite high and cannot be applied at practical non-volatile levels using commercial spray equipment. Furthermore, if the butyryl content is decreased and the intrinsic viscosity increased beyond the given ranges, the novel solubility and reflow characteristics of the ester are lost.

The amount of cellulose ester used in our bake-sand-bake system will vary with the particular acrylic or alkyd resin which is used. However, we have found the operable range of cellulose acetate butyrate to be from about 10% to about 50% by weight of the non-volatile ingredients.

It should also be noted that if elimination of floating and flooding of pigments is the only objective in mind (apart from seeking a bake-hand-bake system), the amount of cellulose acetate butyrate can go as low as about 3% by weight of the non-volatile ingredients.

The melamine-formaldehyde resins which are suitable for use in our invention are made by processes well known to the trade. Among the melamine-formaldehyde resins that we have found to be particularly applicable in this system are the butylated melamine-formaldehyde resins such as those sold under the trade names Plaskon 3382, Resimene 879, and Beckamine 1216–S. Another melamine-formaldehyde resin which gives very satisfactory results is hexamethoxymethyl melamine-formaldehyde resin, that resin sold under the trade name Cymel 300.

The alkyd resins suitable for this system may be either oil-free alkyds or oil-modified alkyds. The oil-free alkyds have no unsaturation and are reactive with melamine-formaldehyde through the pendant hydroxyl groups. Most oil-free alkyds that find use in our system have acid numbers of 0.5 to 15 and free hydroxyl numbers of 50 to 200.

Oil-free alkyds may be made by reacting polyhydric alcohols with dibasic acids. The following is an example of an oil-free alkyd resin that may be used in the present enamel system.

Oil-Free Alkyd Resin No. 1

| Composition A: | Weight, percent |
| --- | --- |
| Adipic acid | 25 |
| Isophthalic acid | 75 |
|  | 100 |

| Composition B: | Weight, percent |
| --- | --- |
| Neopentyl glycol | 50 |
| Trimethylolpropane | 50 |
|  | 100 |

Composition A is reacted with an excess of Composition B at about 35% excess of the glycol mixture above the amount needed to completely esterify the acids.

Oil-modified alkyds which may be employed in this system have acid numbers of 0.5 to 10 and free-hydroxyl numbers of 50 to 80. The following are two examples of oil-modified alkyd resins that may be used in our system.

Oil-Modified Alkyd Resin No. 1

| Composition A: | Weight, percent |
| --- | --- |
| Lauric acid | 45.0 |
| Fumaric acid | 1.5 |
| Phthalic anhydride | 53.5 |
|  | 100.0 |

| Composition B: | Weight, percent |
| --- | --- |
| Pentaerythritol | 67.0 |
| Ethylene glycol | 33.0 |
|  | 100.0 |

Composition A is reacted with Composition B with about 28% excess glycol being present after complete esterification of the acids.

Oil-Modified Alkyd Resin No. 2

| Composition A: | Weight, percent |
| --- | --- |
| Lauric acid | 45.0 |
| Fumaric acid | 1.5 |
| Phthalic anhydride | 53.5 |
|  | 100.0 |

| Composition B: | Weight, percent |
| --- | --- |
| Pentaerythritol | 53.0 |
| Neopentyl glycol | 47.0 |
|  | 100.0 |

Composition A is reacted with Compositon B so that 30% excess glycol is present after complete esterification of the acids have taken place.

The thermosetting acrylic resins suitable for use in this invention are made by processes well known to the trade. Examples of acrylic resins which we have found to give satisfactory results in the practice of this invention include the following.

Acrylic Resin No. 1

| Composition: | Weight, percent |
| --- | --- |
| Acrylamide | 15.0 |
| Styrene | 82.5 |
| Methacrylic acid | 2.5 |
|  | 100.0 |

Acrylic Resin No. 2

| Composition: | Weight, percent |
| --- | --- |
| Acrylamide | 15.0 |
| Methyl methacrylate | 25.0 |
| Ethyl acrylate | 60.0 |
|  | 100.0 |

Acrylic Resin No. 3

| Composition: | Weight, percent |
| --- | --- |
| Hydroxy alkyl methacrylate | 20.0 |
| Styrene | 60.0 |
| Methyl methacrylate | 20.0 |
|  | 100.0 |

Acrylic Resin No. 4

| Composition: | Weight, percent |
| --- | --- |
| Methyl acrylamide | 17.5 |
| Ethyl hexyl acrylate | 24.0 |
| Styrene | 58.5 |
|  | 100.0 |

The following specific examples will serve to more fully explain our invention. However, it will be understood that these are only examples and in no way limiting of the invention.

EXAMPLE 1

The following coating composition was prepared:

| Ingredients: | Weight, percent |
| --- | --- |
| $TiO_2$ pigment | 9.5 |
| Butylated melamine-formaldehyde resin | 5.0 |
| Cellulose acetate butyrate (having a butyryl content of 51.5%, an acetyl content of 3%, a hydroxy content of 1.5%, and an intrinsic viscosity of 0.42) | 8.5 |
| Oil-free alkyd resin No. 1 [1] | 11.5 |
| Xylene | 26.5 |
| Toluene | 20.0 |
| Butyl alcohol | 8.0 |
| Ethyl alcohol | 6.0 |
| Ethylene glycol monoethyl ether acetate | 5.0 |
|  | 100.0 |

[1] This resin composition was previously discussed in the specification.

The above coating composition was sprayed on a metal panel such as would be used in the door of an automobile. This panel was then force dried at 180° F. for 20 minutes, thus releasing the volatile solvents. Then the panel was wet sanded with a finely abrasive sandpaper wet with mineral spirits. The wet sanding operation removed the rough spots, sagging, and other imperfections in the coating. After the sanding operation, the coated panel was baked for 285° F. for 30 minutes. During the second bake operation, the coating became fluid and reflowed allowing all of the sand marks to melt in.

The finished metal panel had a very high degree of gloss and no further sanding, buffing, or polishing was required. The problem of floating or flooding of pigments was not present.

EXAMPLE 2

The following coating composition was prepared:

| Ingredients: | Weight, percent |
| --- | --- |
| Pigment (Monastaral Blue) | 0.9 |
| Alcoa 226 aluminum powder | 0.9 |
| Oil-free alkyd resin No. 1 [1] | 13.5 |
| Butylated melamine-formaldehyde resin | 6.0 |
| Cellulose acetate butyrate (having a butyryl content of 53.5%, an acetyl content of 2%, a hydroxyl content of 2%, and an intrinsic viscosity of 0.72) | 10.32 |
| Butyl alcohol | 8.0 |
| Texanol acetate [2] | 5.0 |
| Xylene | 24.18 |
| Toluene | 25.0 |
| Ethyl alcohol | 6.20 |
|  | 100.00 |

[1] This resin composition was previously discussed in the specification.
[2] 2,2,4-trimethylpentanediol-1,3-monoisobutyrate acetate.

The procedure of Example 1 was followed and a metal panel was produced having a very high degree of gloss and possessing similar properties to the panel prepared in Example 1.

EXAMPLE 3

The following coating composition was prepared:

| Ingredients: | Weight, percent |
| --- | --- |
| $TiO_2$ pigment | 10.0 |
| Hexamethoxymethyl melamine-formaldehyde resin | 5.0 |
| Cellulose acetate butyrate (having a butyryl content of 51.5%, a hydroxyl content of 1.8%, an acetyl content of 2.5%, and an intrinsic viscosity of 0.60) | 8.5 |
| Oil-modified alkyd resin No. 1 [1] | 10.0 |
| Toluene | 20.0 |
| Xylene | 29.5 |
| Ethyl alcohol | 6.0 |
| Butyl alcohol | 6.0 |
| Ethylene glycol monoethyl ether acetate | 5.0 |
|  | 100.0 |

[1] This resin composition was previously discussed in the specification.

The procedure of Example 1 was again followed and a metal panel having similar properties to that prepared in Example 1 was produced.

EXAMPLE 4

A coating composition having the following ingredients was prepared:

| Ingredients: | Weight, percent |
| --- | --- |
| $TiO_2$ pigment | 9.5 |
| Phthalocyanine blue | 0.5 |
| Oil-modified alkyd resin No. 2 [1] | 10.0 |
| Cellulose acetate butyrate (having a butyryl content of 51.5%, an acetyl content of 1.8%, a hydroxyl content of 1.5%, and an intrinsic viscosity of 0.40) | 8.5 |
| Hexamethoxymethyl melamine - formaldehyde resin | 5.0 |
| Ethyl alcohol | 8.0 |
| Butyl alcohol | 8.0 |
| Toluene | 20.0 |
| Xylene | 26.5 |
| Ethylene glycol monoethyl ether acetate | 5.0 |
|  | 100.0 |

[1] This resin composition was previously discussed in the specification.

The procedure of Example 1 was repeated and a metal panel having similar properties was obtained.

EXAMPLE 5

A coating composition having the following ingredients was prepared:

| Ingredients: | Weight, percent |
|---|---|
| TiO$_2$ pigment | 9.0 |
| Acrylic resin No. 1 [1] | 11.2 |
| Cellulose acetate butyrate (having a butyryl content of 50.0%, an acetyl content of 2%, a hydroxyl content of 2.5%, and an intrinsic viscosity of 0.65) | 7.0 |
| Butylated melamine-formaldehyde resin | 5.0 |
| Toluene | 20.0 |
| Xylene | 27.8 |
| Ethyl alcohol | 8.0 |
| Butyl alcohol | 5.0 |
| Ethylene glycol monoethyl ether acetate | 7.0 |
| | 100.0 |

[1] This resin composition was previously discussed in the specification.

The procedure of Example 1 was repeated and a metal panel possessing similar properties was obtained.

In the above examples, the cellulose acetate butyrate allowed the composition to dry like a lacquer, thereby enabling a wet-sanding operation to be performed, and aided in the higher bake reflow process, thereby causing sandmarks to fuse together before cross-linking occurred.

The first bake temperature in this system is limited and will vary depending upon the type of alkyd, acrylic, and melamine-formaldehyde resins that are used. If the low-bake temperature exceeds the point where any cross-linking has started, the system will not be thermally reflowable after it has been wet sanded. Our work has shown that these first bake temperatures are at a low bake range and will vary from about 120° to about 225° F. Furthermore, the maximum time permissible for such a baking temperature varies from about 30 minutes to about 2 hours.

The second or higher bake operation may be conducted at a temperature range of between 250–450° F.

It will be readily apparent that our system is not only useful in automotive finishing but also for finishing any type of appliances and other metal objects where a high gloss thermosetting system is desired.

Although our invention has been described in considerable detail with particular reference to certain preferred embodiments thereof, variations and modifications can be effected within the spirit and scope of the invention as described hereinbefore and as defined in the appended claims.

We claim:
1. A process for coating a metallic article with a thermally reflowable thermosetting coating composition comprising the steps of:
   (A) Applying to the metallic article a coating composition comprising 10–50 parts by weight of cellulose acetate butyrate, 10–50 parts by weight of a melamine-formaldehyde resin, and 20–60 parts by weight of a resinous composition selected from the group consisting of alkyd resins and thermosetting acrylic resins;
   (B) Drying the coated metallic article at a relatively low temperature to release volatile solvents;
   (C) Sanding rough and irregular portions of the coating composition; and then
   (D) Consecutively thermally reflowing and thermosetting the coating composition by heating the sanded article at a relatively high temperature.
2. A process for coating a metallic article as recited in claim 1 wherein the relatively low temperature of Step B ranges from about 120° F. to about 225° F. and the relatively high temperature of Step D ranges from about 250° F. to about 450° F.

3. A process for coating a metallic article as recited in claim 2 wherein the cellulose acetate butyrate of Step A has a butyryl content of from about 45% to about 56%, an acetyl content of from about 0% to about 5%, a hydroxyl content of from about 0.05% to about 5%, and an intrinsic viscosity range of from about 0.2 to about 1.0.

4. A process for coating a metallic article as recited in claim 3 wherein the cellulose acetate butyrate of Step A has a butyryl content of from about 54% to about 56%, an acetyl content of from about 0% to about 3%, a hydroxyl content of from about 1% to about 2.25%, and an intrinsic viscosity range of from about 0.2 to about 1.0.

5. A process for coating a metallic article as recited in claim 4 wherein the cellulose acetate butyrate of Step A has a butyryl content of about 55%, an acetyl content of about 2%, a hydroxyl content of about 1.5%, and an intrinsic viscosity of about 0.2.

6. A process for coating a metallic article as recited in claim 3 wherein the resinous composition of Step A is an alkyd resin.

7. A process for coating a metallic article as recited in claim 6 wherein the alkyd resin is an oil-free alkyd resin.

8. A process for coating a metallic article as recited in claim 6 wherein the alkyd resin is an oil-modified alkyd resin.

9. A process for coating a metallic article as recited in claim 3 wherein the resinous composition of Step A is a thermosetting acrylic resin.

10. A process for coating a metallic article as recited in claim 3 wherein the melamine-formaldehyde resin of Step A is a butylated melamine-formaldehyde resin.

11. A process for coating a metallic article as recited in claim 3 wherein the coating composition of Step A is dissolved in a solvent therefor.

12. A process for coating a metallic article as recited in claim 3 wherein the melamine-formaldehyde resin is hexamethoxymethyl melamine-formaldehyde resin.

13. A process for coating a metallic article as recited in claim 3 wherein the process includes additional steps of:
   (E) Applying a repair coating composition to the coating composition of Step A, said repair coating composition comprising 10–50 parts by weight of cellulose acetate butyrate, 10.50 parts by weight of a melamine-formaldehyde resin, 20–60 parts by weight of a resinous composition selected from the group consisting alkyd resins and acrylic resins, and a solvent for said repair coating composition and the coating composition of Step A; and then
   (F) Consecutively thermally reflowing and thermosetting the repair coating composition at a temperature ranging from about 250° F. to about 450° F.

14. A process for coating a metallic article as recited in claim 13 wherein the cellulose acetate butyrate of the repair coating composition of Step E has a butyryl content of from about 45% to about 56%, an acetyl content of from about 0% to about 5%, a hydroxyl content of from about 0.05% to about 5%, and an intrinsic viscosity range of from about 0.2 to about 1.0.

15. A process for coating a metallic article as recited in claim 3 wherein the coating composition comprises, by weight, about 8.5% cellulose acetate butyrate having a butyryl content of about 51.5%, an acetyl content of about 3%, a hydroxyl content of about 1.5%, and an intrinsic viscosity of about 0.42; about 5.0% butylated melamine-formaldehyde resin; about 11.5% oil-free alkyd resin; about 26.5% xylene; about 20.0% toluene; about 8.0% butyl alcohol; about 6.0% ethyl alcohol; about 5.0% ethylene glycol monoethyl ether acetate; and about 9.5% titanium dioxide.

16. A process for coating a metallic article as recited in claim 3 wherein the coating composition comprises, by weight, about 10.32% cellulose acetate butyrate having a butyryl content of about 53.5%, an acetyl content of about 2%, a hydroxyl content of about 2%, and an intrinsic viscosity of about 0.72; about 6.0% butylated melamine-formaldehyde resin; about 13.5% oil-free alkyd resin; about 24.18% xylene; about 25.0% toluene; about 8.0% butyl alcohol; about 6.20% ethyl alcohol; about 5.0% 2,2,4-trimethylpentanediol-1,3-monoisobutyrate acetate; and about 0.9% aluminum powder.

17. A process for coating a metallic article as recited in claim 3 wherein the coating composition comprises, by weight, about 8.5% cellulose acetate butyrate having a butyryl content of about 51.5%, an acetyl content of about 2.5%, a hydroxyl content of about 1.8%, and an intrinsic viscosity of about 0.60; about 5.0% hexamethoxymethyl melamine-formaldehyde resin; about 10.0% oil-modified alkyd resin; about 29.5% xylene; about 20.0% toluene; about 6.0% butyl alcohol; about 6.0% ethyl alcohol; about 5.0% ethylene glycol monoethyl ether acetate; and about 10.0% titanium dioxide.

18. A process for coating a metallic article as recited in claim 3 wherein the coating composition comprises, by weight, about 8.5% cellulose acetate butyrate having a butyryl content of about 51.5%, an acetyl content of about 1.8%, a hydroxyl content of about 1.5%, and an intrinsic viscosity of about 0.40; about 5.0% hexamethoxymethyl melamine-formaldehyde resin; about 10.0% oil-modified alkyd resin; about 26.5% xylene; about 20.0% toluene; about 8.0% butyl alcohol; about 8.0% ethyl alcohol; about 5.0% ethylene glycol monoethyl ether acetate; about 0.5% phthalocyanine blue pigment; and about 9.5% titanium dioxide.

19. A process for coating a metallic article as recited in claim 3 wherein the coating composition comprises, by weight, about 7.0% cellulose acetate butyrate having a butyryl content of about 50.0%, an acetyl content of about 2%, a hydroxyl content of about 2.5%, and an intrinsic viscosity of about 0.65; about 5.0% butylated melamine-formaldehyde resin; about 11.2% acrylic resin; about 27.8% xylene; about 20.0% toluene; about 5.0% butyl alcohol; about 8.0% ethyl alcohol; about 7.0% ethylene glycol monoethyl ether acetate; and about 9.0% titanium dioxide.

References Cited

UNITED STATES PATENTS

| | | | |
|---|---|---|---|
| 2,186,454 | 1/1940 | Gloor | 260—16 |
| 2,782,131 | 2/1957 | Johnson | 260—15 |
| 2,875,164 | 2/1959 | Ball et al. | 260—15 |
| 2,937,153 | 5/1960 | Rasmussen et al. | 260—15 |
| 1,904,417 | 4/1933 | Crystler | 117—64 |
| 3,265,645 | 8/1966 | Coney et al. | |
| 3,276,905 | 10/1966 | Porter | 117—74 |

WILLIAM H. SHORT, *Primary Examiner.*

E. M. WOODBERRY, *Assistant Examiner.*